(12) United States Patent
Baca et al.

(10) Patent No.: US 10,274,685 B2
(45) Date of Patent: Apr. 30, 2019

(54) METHODS OF MAKING FIBER OPTIC CONNECTOR SUB-ASSEMBLIES

(71) Applicant: CORNING OPTICAL COMMUNICATIONS LLC, Hickory, NC (US)

(72) Inventors: Adra Smith Baca, Hickory, NC (US); Rebecca Lynn Burt, Painted Post, NY (US); Jeffrey Dean Danley, Hickory, NC (US); Darrin Max Miller, Hickory, NC (US); Dennis Craig Morrison, Lincolnton, NC (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 15/901,151

(22) Filed: Feb. 21, 2018

(65) Prior Publication Data

US 2018/0180823 A1 Jun. 28, 2018

Related U.S. Application Data

(63) Continuation of application No. PCT/US2016/045783, filed on Aug. 5, 2016, which is a continuation of application No. 14/886,905, filed on Oct. 19, 2015, now Pat. No. 9,581,768.

(60) Provisional application No. 62/208,131, filed on Aug. 21, 2015.

(51) Int. Cl.
| | |
|---|---|
| *G02B 6/38* | (2006.01) |
| *C09J 171/08* | (2006.01) |
| *C09J 179/08* | (2006.01) |
| *C09J 181/04* | (2006.01) |
| *C09J 161/02* | (2006.01) |

(52) U.S. Cl.
CPC .......... *G02B 6/3861* (2013.01); *C09J 161/02* (2013.01); *C09J 171/08* (2013.01); *C09J 179/08* (2013.01); *C09J 181/04* (2013.01)

(58) Field of Classification Search
CPC ..... G02B 6/3861; C09J 161/02; C09J 171/08; C09J 179/08; C09J 181/04
USPC .......................................................... 385/80
See application file for complete search history.

(56) References Cited

U.S. PATENT DOCUMENTS

| | | | |
|---|---|---|---|
| 4,198,119 A | 4/1980 | Uberbacher | |
| 4,303,304 A | 12/1981 | Ruiz | |
| 4,362,356 A | 12/1982 | Williams et al. | |
| 4,984,865 A | 1/1991 | Lee et al. | |
| 5,048,915 A | 9/1991 | Coutts et al. | |
| 5,418,876 A | 5/1995 | Lee | |
| 5,631,986 A | 5/1997 | Frey et al. | |
| 6,007,258 A | 12/1999 | Marchitto et al. | |
| 6,895,654 B2 | 5/2005 | Strandberg et al. | |

(Continued)

FOREIGN PATENT DOCUMENTS

| | | |
|---|---|---|
| JP | 59109014 A | 6/1984 |
| JP | 2014013410 A | 1/2014 |

*Primary Examiner* — Jerry M Blevins
(74) *Attorney, Agent, or Firm* — Adam R. Weeks (57) ABSTRACT

A method of making a fiber optic connector sub-assembly involves: initially disposing a bonding agent in a ferrule bore of a ferrule; heating at least a portion of the ferrule above a melting temperature of the bonding agent so that some of the bonding agent melts; and solidifying the bonding agent that has melted to form the fiber optic connector sub-assembly, all without an optical fiber being disposed within the ferrule bore.

20 Claims, 10 Drawing Sheets

(56) References Cited

U.S. PATENT DOCUMENTS

| | | |
|---|---|---|
| 7,147,384 B2 | 12/2006 | Hardcastle et al. |
| 7,255,486 B2 | 4/2007 | Cox et al. |
| 7,306,376 B2 | 12/2007 | Scerbak et al. |
| 8,702,322 B1 * | 4/2014 | Danley ................ G02B 6/3833 385/80 |
| 8,753,021 B1 | 6/2014 | Baca et al. |
| 9,039,295 B2 | 5/2015 | Fewkes et al. |
| 9,128,254 B2 | 9/2015 | Danley et al. |
| 9,429,719 B1 | 8/2016 | Danley et al. |
| 9,581,768 B1 | 2/2017 | Baca et al. |
| 9,588,303 B2 | 3/2017 | Danley et al. |
| 2002/0186934 A1 | 12/2002 | Hug et al. |
| 2003/0009869 A1 | 1/2003 | Standberg et al. |
| 2005/0213891 A1 | 9/2005 | Hardcastle et al. |
| 2006/0104574 A1 | 5/2006 | Cox et al. |
| 2012/0315001 A1 | 12/2012 | Beck |
| 2015/0098679 A1 | 4/2015 | Fewkes et al. |
| 2015/0219861 A1 | 8/2015 | Danley et al. |
| 2015/0301292 A1 | 10/2015 | Danley et al. |
| 2015/0346452 A1 | 12/2015 | Chien et al. |
| 2016/0062054 A1 | 3/2016 | Danley et al. |
| 2017/0131484 A1 | 5/2017 | Danley et al. |
| 2018/0059335 A1 | 3/2018 | Lock et al. |
| 2018/0059336 A1 | 3/2018 | Baca et al. |
| 2018/0180822 A1 | 6/2018 | Baca et al. |
| 2018/0180823 A1 | 6/2018 | Baca et al. |

* cited by examiner

METHODS OF MAKING FIBER OPTIC CONNECTOR SUB-ASSEMBLIES

PRIORITY APPLICATIONS

This application is a continuation of PCT Application No. PCT/US2016/045783, filed on Aug. 5, 2016, which is a continuation of U.S. Pat. No. 9,581,768, filed on Oct. 19, 2015, which claims the benefit of priority of U.S. Provisional Application Ser. No. 62/208,131 filed on Aug. 21, 2015. The content of each of these applications is relied upon and incorporated herein by reference in its entirety.

BACKGROUND

This disclosure relates generally to optical connectivity, and more particularly to fiber optic connector sub-assemblies having a ferrule and bonding agent disposed in the ferrule, along with methods of making such sub-assemblies.

Optical fibers are useful in a wide variety of applications, including the telecommunications industry for voice, video, and data transmissions. In a telecommunications system that uses optical fibers, there are typically many locations where fiber optic cables that carry the optical fibers connect to equipment or other fiber optic cables. To conveniently provide these connections, fiber optic connectors are often provided on the ends of fiber optic cables. The process of terminating individual optical fibers from a fiber optic cable is referred to as "connectorization." Connectorization can be done in a factory, resulting in a "pre-connectorized" or "pre-terminated" fiber optic cable, or the field (e.g., using a "field-installable fiber optic connector).

Regardless of where installation occurs, a fiber optic connector typically includes a ferrule with one or more bores that receive one or more optical fibers. The ferrule supports and positions the optical fiber(s), which are secured within a bore of the ferrule using a bonding agent. Some bonding agents have been specifically developed to allow "preloading" the bonding agent into the ferrule bore prior to a connectorization process. Despite these developments, there remains room for improvement.

SUMMARY

One embodiment of this disclosure relates to a fiber optic connector sub-assembly that includes a ferrule having a front end, a rear end, and a ferrule bore extending between the front and rear ends along a longitudinal axis. The fiber optic connector sub-assembly also includes a bonding agent disposed in the ferrule bore and having first and second ends along the longitudinal axis. The bonding agent has been melted and solidified at the first and second ends. Furthermore, in some embodiments at least a portion of the bonding agent between the first and second ends has not been melted and solidified.

Another embodiment of a fiber optic connector sub-assembly includes a ferrule having a front end, a rear end, and a ferrule bore extending between the front and rear ends along a longitudinal axis. The ferrule bore includes a first section extending inwardly from the rear end of the ferrule and having a first width, a second section extending inwardly from the front end of the ferrule and having a second width that is less than the first width, and a transition section located between the first section and the second section. The fiber optic connector sub-assembly also includes a bonding agent disposed in at least a portion of both the transition section and the second section of the ferrule bore. At least some of the bonding agent in the second section of the ferrule bore has been melted and solidified.

Methods of making a fiber optic connector sub-assembly are also disclosed, wherein the fiber optic connector sub-assembly includes a ferrule having a front end, a rear end, a ferrule bore extending between the front and rear ends along a longitudinal axis. One example of such methods comprises: (a) initially disposing a bonding agent in the ferrule bore; (b) heating at least a portion of the ferrule above a melting temperature of the bonding agent initially disposed in the ferrule bore so that some of the bonding agent melts; and (c) solidifying the bonding agent that has melted in step (b) to form the fiber optic connector sub-assembly. The bonding agent has first and second ends along the longitudinal axis that have been melted and solidified following steps (b) and (c). Additionally, a portion of the bonding agent initially disposed in the ferrule bore in step (a) remains below the melting temperature of the bonding agent during steps (b) and (c) so as to not melt and solidify during steps (b) and (c).

Another example of methods disclosed herein involves a ferrule having a front end, a rear end, a ferrule bore extending between the front and rear ends along a longitudinal axis, wherein the ferrule bore includes a first section extending inwardly from the rear end of the ferrule and having a first width, a second section extending inwardly from the front end of the ferrule and having a second width that is less than the first width, and a transition section located between the first section and the second section. According to this example, the method comprises: (a) initially disposing a bonding agent in at least the transition section of the ferrule bore; (b) heating at least a portion of the ferrule above a melting temperature of the bonding agent initially disposed in the ferrule bore so that at least some of the bonding agent melts; and (c) solidifying the bonding agent that has melted in step (b), wherein at least some of the bonding agent that has been melted and solidified is disposed in the second section of the ferrule bore.

Additional features and advantages will be set forth in the detailed description which follows, and in part will be readily apparent to those skilled in the technical field of optical communications. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the description serve to explain principles and operation of the various embodiments. Persons skilled in the technical field of optical connectivity will appreciate how features and attributes associated with embodiments shown in one of the drawings may be applied to embodiments shown in others of the drawings.

DETAILED DESCRIPTION

Figure 1:
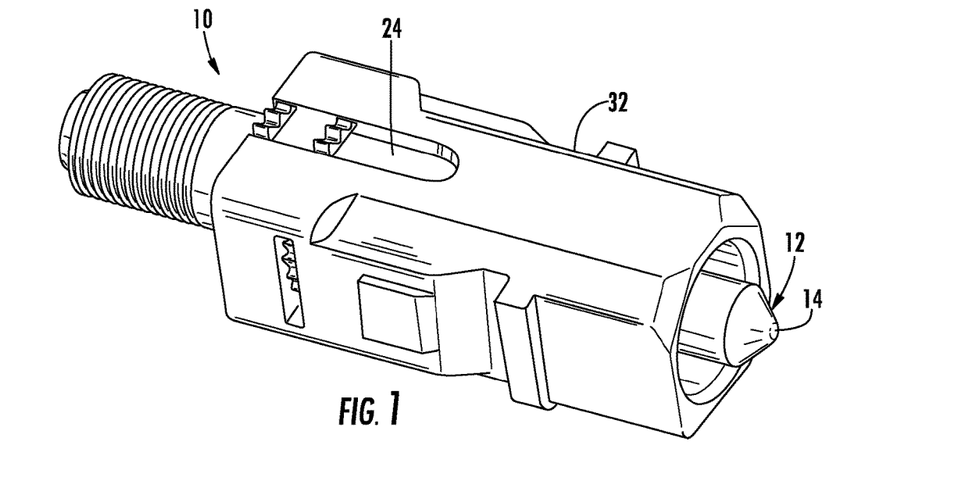
FIG. 1 a perspective view of an example of a fiber optic connector.

Various embodiments will be further clarified by examples in the description below. In general, the description relates to fiber optic connector sub-assemblies and methods of making the same. The sub-assemblies and methods may facilitate the cable assembly process for a fiber optic cable. That is, the sub-assemblies and methods may be initial steps to facilitate terminating one or more optical fibers from a fiber optic cable with a fiber optic connector to form a cable assembly. One example of a fiber optic connector (also referred to as "optical connector 10", or simply "connector 10") for such a cable assembly is shown in FIG. 1. Although the connector 10 is shown in the form of a SC-type connector, the methods described below may be applicable to processes involving different fiber optic connector designs. This includes ST, LC, FC, MU, and MPO-type connectors, for example, and other single-fiber or multi-fiber connector designs. A general overview of the connector 10 will be provided simply to facilitate discussion.

Figure 2:
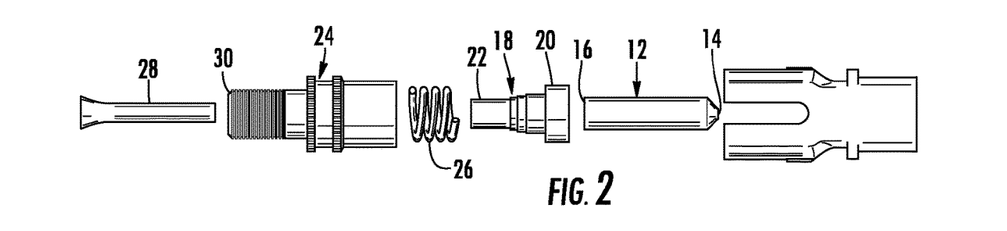
FIG. 2 is an exploded side view the fiber optic connector of FIG. 1.

As shown in FIGS. 1 and 2, the connector 10 includes a ferrule 12 having a front end 14 ("mating end") and rear end 16 ("insertion end"), a ferrule holder 18 having opposed first and second end portions 20, 22, and a housing 24 (also referred to as "inner housing 24" or "connector body 24"). The rear end 14 of the ferrule 12 is received in the first end portion 20 of the ferrule holder 18 while the front end 14 remains outside the ferrule holder 18. The second end portion 22 of the ferrule holder 18 is received in the housing 24. A spring 26 may be disposed around the second end portion 22 and configured to interact with walls of the housing 24 to bias the ferrule holder 18 (and ferrule 12). Additionally, a lead-in tube 28 may extend from a rear end of the housing 24 to within the second end portion 22 of the ferrule holder 18 to help guide the insertion of an optical fiber (not shown in FIGS. 1 and 2) into the ferrule 12. An outer shroud 32 (also referred to as "outer housing 32") is positioned over the assembled ferrule 12, ferrule holder 18, and housing 24, with the overall configuration being such that the front end 16 of the ferrule 12 presents an end face configured to contact a mating component (e.g., another fiber optic connector; not shown).

In a manner not shown herein, a fiber optic cable providing the optical fiber also includes one or more layers of material (e.g., strength layer of aramid yarn) that may be crimped onto a rear end portion 30 of the housing 24, which is why the housing 24 may also be referred to as a "crimp body" or "retention body". A crimp band (or "crimp ring") may be provided for this purpose. Additionally, a strain-relieving boot may be placed over the crimped region and extend rearwardly to cover a portion of the fiber optic cable. Variations of these aspects will be appreciated by persons familiar with the design of fiber optic cable assemblies. For example, other ways of securing a fiber optic cable to the housing 24 are also known and may be employed in some embodiments. Again, the embodiment shown in FIGS. 1 and 2 is merely an example of a fiber optic connector to which the fiber optic connector sub-assemblies and methods provided in this disclosure may relate.

Figure 3:
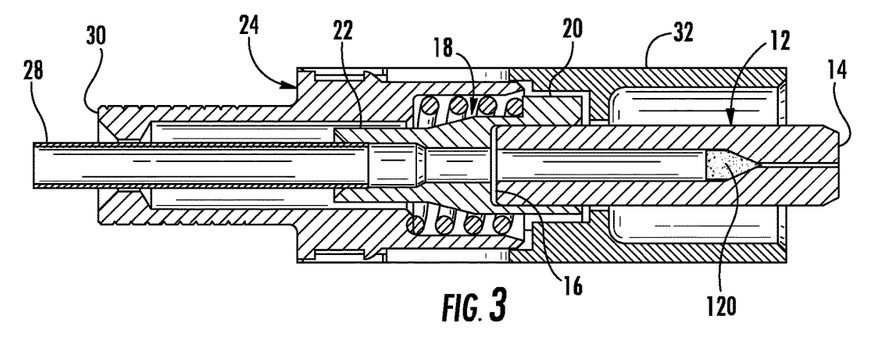
FIG. 3 is a cross-sectional view of a fiber optic connector according to another embodiment.
Figure 4:
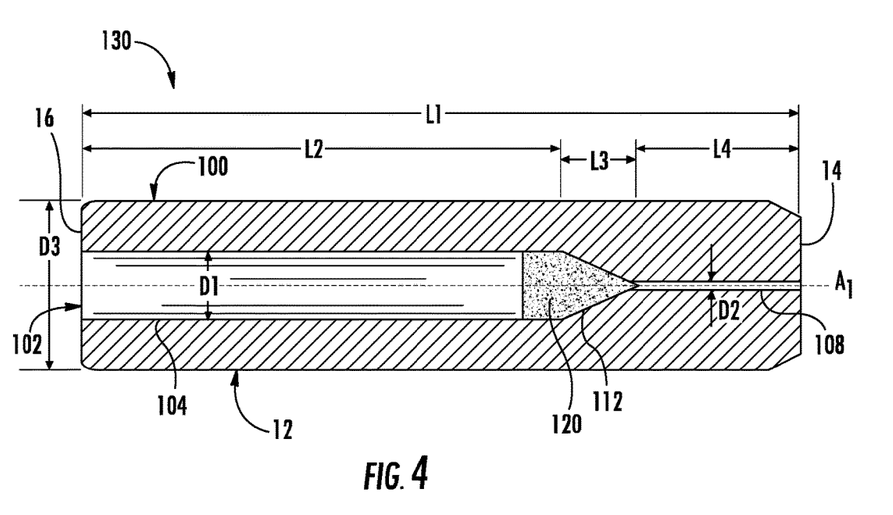
FIG. 4 is a cross-sectional view of an example of a fiber optic connector sub-assembly for the fiber optic connector of FIG. 2, wherein the fiber optic connector sub-assembly includes a ferrule and bonding agent disposed in the ferrule.

FIG. 3 illustrates the connector 10 in further detail, and FIG. 4 is an enlarged view of the ferrule 12 in isolation. The ferrule 12 may be the same as that described in U.S. Pat. No. 8,702,322 ("the '322 patent"), which describes many details related to the geometry of the ferrule, the location of a bonding agent within a bore of the ferrule, and possible compositions for the bonding agent, this information being incorporated herein by reference. In general, the ferrule 12 includes a ferrule bore 102 extending between the front and rear ends 14, 16 along a longitudinal axis A1. More specifically, the ferrule bore 102 has a first section 104 extending inwardly from the rear end 16 of the ferrule 12, a second section 108 (also referred to as "micro-hole" or "micro-hole section") extending inwardly from the front end 14 of the ferrule 12, and a transition section 112 located between the first section 104 and the second section 108. The first, second, and transition sections 104, 108, 112 have respective lengths L1, L2, and L3 measured along or parallel to the longitudinal axis A1. The front and rear ends 14, 16 define respective front and rear end faces of the ferrule 12 that extend in planes parallel or substantially parallel to each other but substantially perpendicular to the longitudinal axis A1. In some embodiments, the front end face may be at a slight angle relative to the longitudinal axis A1 to provide, for example, an angled physical contact (APC) end face.

Still referring to FIGS. 3 and 4, the first section 104 of the ferrule bore 102 has a first width, and the second section 108 has a second width less than the first width such that the transition section 112 provides a decrease in width between the first section 104 and second section 108. More specifically, in the embodiment shown, the first section 104 of the ferrule bore 102 is a cylindrical bore extending from the rear end 16 of the ferrule 12 to the transition section 112 such that the first width is a first diameter D1. The second section 108 of the ferrule bore 102 is a cylindrical bore extending from the front end 14 of the ferrule 12 to the transition section 112 such that the second width is a second diameter D2. Accordingly, the transition section 112 provides a decrease in diameter between the first section 104 and second section 108.

As shown in FIGS. 3 and 4, a bonding agent 120 is at least partially located in the transition section 112 of the ferrule bore 102. The bonding agent 120 may be pre-loaded or stored within the ferrule 100 for a significant amount of time (e.g., at least an hour, a day, a year, etc.) before inserting an optical fiber into the ferrule bore 102. For example, as mentioned above, the bonding agent 120 may be pre-loaded into the ferrule bore 102 by the manufacturer of the ferrule 100. The combination of the ferrule 12 and bonding agent 120 pre-loaded therein represents a fiber optic connector sub-assembly 130.

The '322 patent describes how the bonding agent 120 may be a free-flowing powder material coupled within the transition section 112 of the ferrule bore 102 via compression. Several additional or alternative steps may be taken, as will be described in greater detail below, to produce the fiber optic connector sub-assembly in an even further advantageous manner. First, however, exemplary bonding agents will be summarized to further provide context for these additional/alternative steps.

Exemplary Bonding Agents

Although the discussion of possible bonding agents in the '322 patent have been incorporated herein by reference, additional details relating to such bonding agents can be found in U.S. Pat. No. 8,696,215 ("the '215 patent") and U.S. Patent Application Pub. No. 2015/0098679 ("the '679 publication"), such details also being incorporated herein by reference. Some information from the '322 patent and/or the '215 patent and '679 publication is summarized below for quick reference.

The bonding agents in the '322 patent, the '215 patent, and '679 publication are configured to be heated and cooled relatively quickly to facilitate the termination process of a fiber optic cable, yet are also configured to provide sufficient coupling between the optical fiber(s) of a fiber optical cable and the ferrule bore. One specific example of the bonding agent is one that comprises a partially cross-linked polymer resin and a coupling agent that provides chemical coupling between the polymer resin and optical fiber(s), the ferrule 12, or both. The presence of the coupling agent allows the polymer resin to be selected primarily for heating and cooling properties rather than adhesion properties. The bonding agent may even comprise a majority of the polymer resin so as to be largely characterized by the heating and cooling properties of the polymer resin. For example, the bonding agent may comprise between about 0.1 to about 10 parts by weight of the coupling agent per 100 parts by weight of the partially cross-linked polymer resin.

As used herein, "cross-linked" or "cross-linking" refers to the chemical bonding that connects a polymer chain to an adjacent polymer chain; "partially cross-linked" is where not all adjacent chains are bonded; and "partially cross-linkable" describes a chemical species that becomes partially cross-linked when sufficient heat is applied. It should be understood that the terms "partially cross-linked" and "partially cross-linkable" describe the same polymer resin before or after partially cross-linking. For example, a polymer resin may be described as partially cross-linkable when it is loaded into a ferrule and has not yet been heated to a temperature that results in the polymer resin partially or completely cross-linking.

One example of a partially cross-linkable polymer resin with desirable heating and cooling characteristics is poly (phenylene sulfide). One example of a coupling agent having desirable adhesion characteristics is a coupling agent having a silane functional group, such as one or more of the following: an alkoxysilane, an oxime silane, an acetoxy silane, a zirconate, a titanate, a silane with an epoxy ring on one end and trimethoxy functional group at the other end, or combinations thereof. Other examples of partially cross-linkable polymers, coupling agents, and bonding agents are described in the '322 patent and '215 patents.

As mentioned above, the bonding agent may be a free-flowing powder material prior to being heated above a cross-linking temperature for the purpose of securing one or more optical fibers in a ferrule. The powder may bay a result of grinding various components of the bonding agent (e.g., the partially cross-linkable resin) that are initially solid in to respective powders, and then mixing powders thoroughly together. Some components of the bonding agent (e.g., the coupling agent) may be a liquid, but the fraction such components in the blend may be relatively small (e.g., less than 10 parts by weight of the overall blend) so that the resulting blend is still considered a free-flowing powder. For example, in one embodiment, the coupling agent may be pre-reacted with the thermoplastic powders in an organic solvent under refluxing conditions. After removal of the solvent, the treated powder remains. Under the conditions of refluxing solvent, some of the coupling agent may have become permanently bonded to the polymer.

The partially cross-linkable polymer resin material of the bonding agent has a melting temperature less than the cross-linking temperature. For example, the partially cross-linkable polymer resins above may each have a melting point at temperatures of less than 250° C., 270°, or 290° C., yet each have a cross-linking temperature (i.e., the temperature at which the resin materials cross-link in the presence of air) of at least 300° C., 325° C., or even 350° C.

Securing the Bonding Agent

Figure 5:
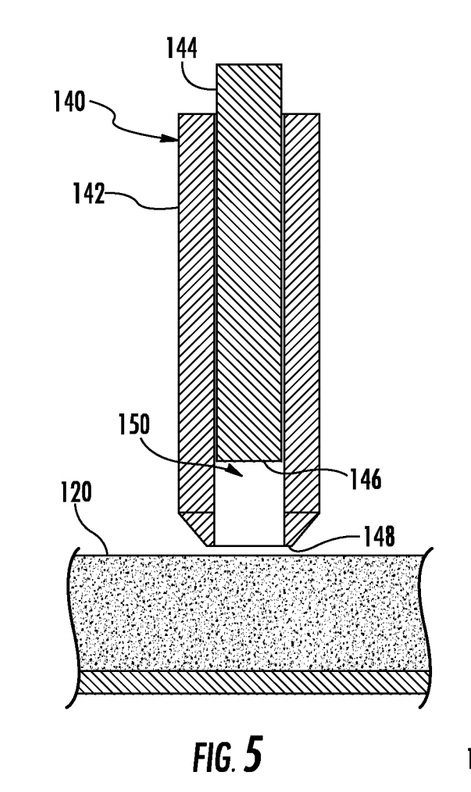
FIGS. 5-11 are schematic views that sequentially illustrate an example of a method of forming a fiber optic connector sub-assembly according to an embodiment of this disclosure.

Having described exemplary bonding agents, a method of making the fiber optic connector sub-assembly 130 (FIG. 4) that includes additional/alternative steps will now be described with reference to FIGS. 5-11. The bonding agent 120 may be initially disposed (i.e., loaded) in the ferrule bore 102 using a loading device 140. In the embodiment shown, the loading device 140 includes a hollow tube 142 ("outer rod") and an inner rod 144 that is slidably received in the tube 142. The loading device 140 is configured to collect a predetermined amount of the bonding agent 120. Referring specifically to FIG. 5, the inner rod 144 has an outer diameter that is substantially the same as (i.e., equal to or within 5% of) an inner diameter of the tube 142, such that the inner rod 144 is closely received in the tube 142. The inner rod 144 is initially set in a retracted position relative to the tube 142 so that a front end 146 of the inner rod 144 is recessed relative to a front end 148 of the tube 142. A cavity 150 defined by this recess corresponds to the predetermined amount of the bonding agent 120 to collect.

Figure 6:
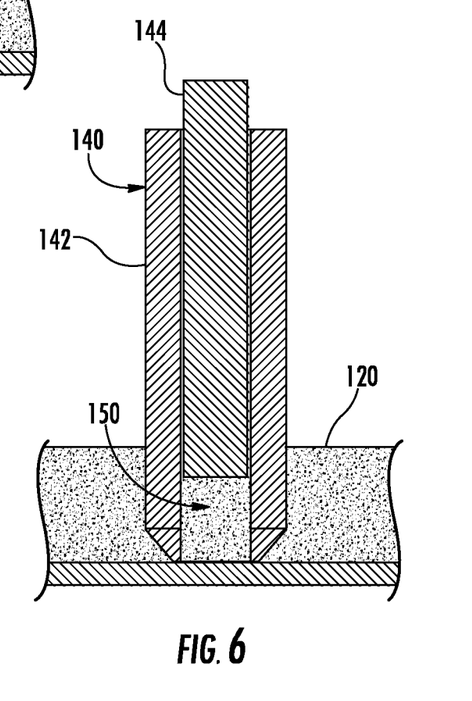
Figure 7:
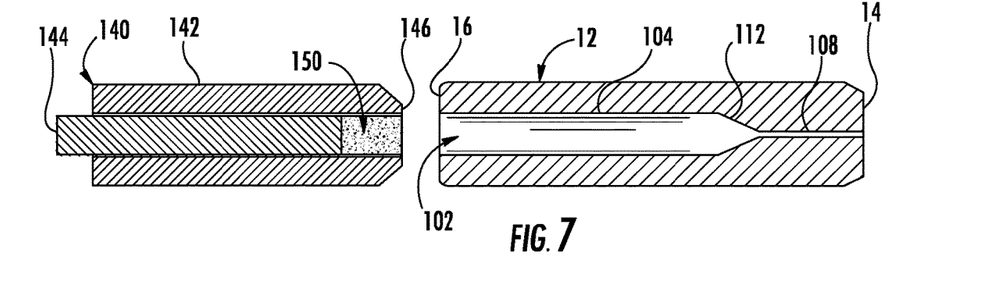
Figure 8:
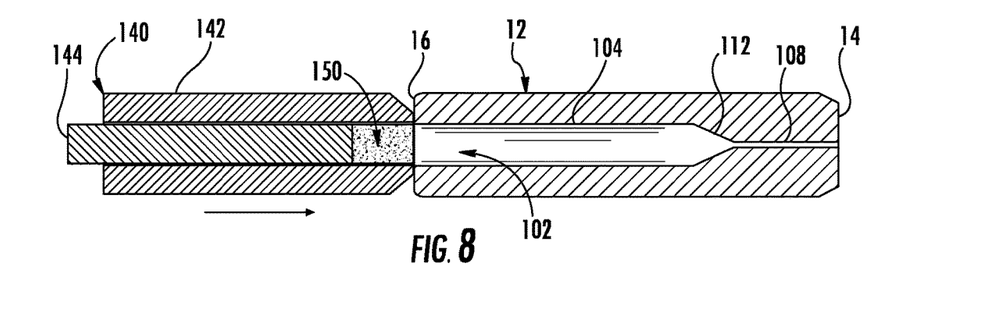
Figure 9:
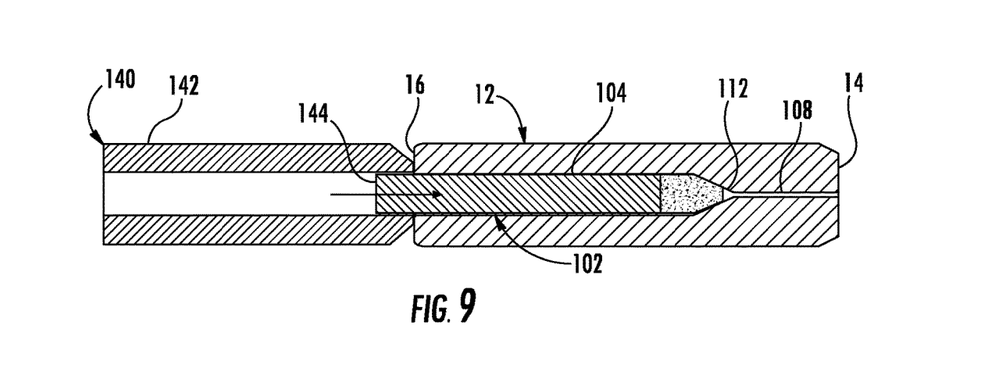

As shown in FIG. 6, the loading device 140 may then be pressed down into a supply of the bonding agent 120 so that the cavity 150 is packed or otherwise filled with the bonding agent 120. The loading device 140 may then be positioned next to the ferrule 12 (FIG. 7) with the cavity 150 aligned with the ferrule bore 102. After contacting the rear end 16 of the ferrule 12 with the front end 148 of the tube 142 (FIG. 8), the inner rod 144 may be advanced/moved relative to the tube 142 and into the ferrule bore 102 (FIG. 9) to move the bonding agent 120 into a desired location within the ferrule bore 102. As mentioned above, examples of desirable locations of the bonding agent 120 within the ferrule bore 102 are discussed in the '322 patent and incorporated herein by reference.

Figure 10:
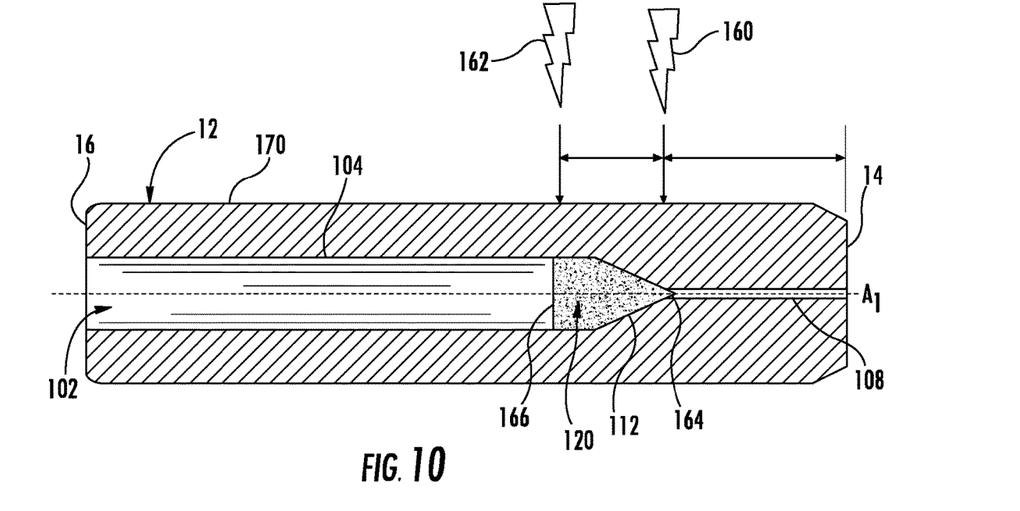

Before or after removing the loading device 140 from the ferrule 12, at least a portion of the ferrule 12 may be heated above a melting temperature of the bonding agent 120. FIG. 10 schematically illustrates the ferrule 12 being heated at first and second locations by first and second heating sources 160, 162. The first location may generally correspond to the beginning of the micro-hole section 108 of the ferrule bore and/or a first end 164 of the bonding agent 120 (i.e., the first location may be a location on an outer surface 170 of the ferrule 12 that is substantially the same distance from the front end 14 as the beginning of the micro-hole section 108 and/or the first end 164 of the bonding agent 120). The second location may generally correspond to a second end 166 of the bonding agent 120 (i.e., the second location may be a location on the outer surface 170 of the ferrule 12 that is substantially the same distance from the front end 14 as the second end 166 of the bonding agent 120). Alternatively or additionally, the second location may generally correspond to the end of the first section 104/beginning of the transition section 112.

In other embodiments, the ferrule 12 may be heated at only a single location or at more than two locations, and there may be only a single heating source or more than two heating sources. The ferrule 12 may alternatively or additionally be moved relative to one or more heating sources, or vice-versa, to heat a portion of the length of the ferrule 12 in a more continuous manner. Specific examples relating to the above-mentioned possibilities will be described in more detail below.

Figure 11:
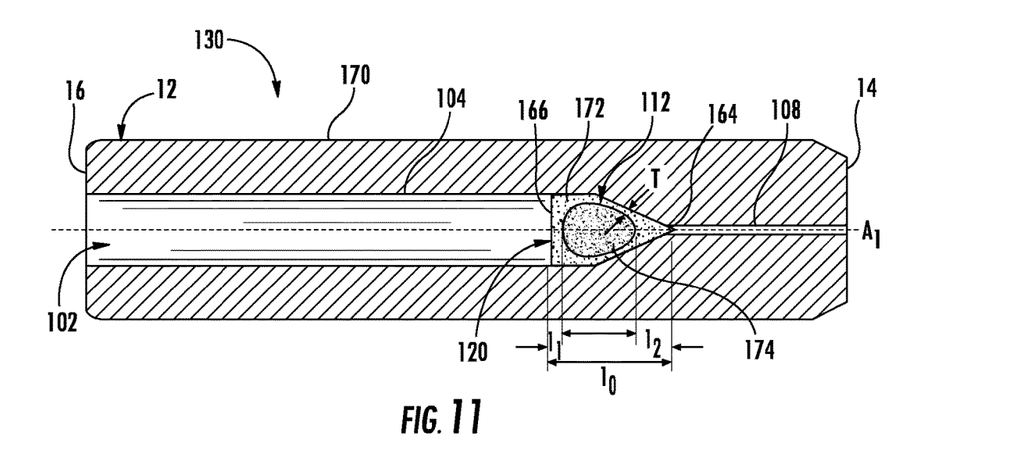

Regardless of how the ferrule 12 is heated with the one or more heating sources, some of the bonding agent 120 melts as a result of the heating process. In particular, at least the first and second ends 164, 166 of the bonding agent 120 melt. The melted bonding agent is then allowed to cool (either passively or actively) to solidify. FIG. 11 illustrates how the portion of the bonding agent 120 that has been melted and solidified may form a solid crust 172 ("crust portion") around a portion 174 of the bonding agent that has not been melted and solidified. The crust portion 172 of the bonding agent 120 is no longer in a powder form. There is some crystallinity in the crust portion (e.g., the crust portion may have a spherulipic crystallinity of about 20-60%).

The other portion 174 of the bonding agent 120, on the other hand, remains in a powder form in this embodiment (and, therefore, may be referred to as the "powder portion" or "powder material" of the bonding agent). For example, the powder portion 174 may still comprise particles of the bonding agent 120 material having an average size (e.g., maximum diameter or width) between 8 and 100 microns. The powder portion 174 is not crystalline (and not quenched), and instead is amorphous.

There are various ways to characterize the difference between the crust portion 172 and powder portion 174 other than the distinction between a solid region and powder region. For example, the crust portion 172 may have a density between about 1.0 grams per cubic centimeter (g/cc) and 1.5 g/cc (and specifically between about 1.3 g/cc and 1.4 g/cc in some embodiments), whereas the powder portion 174 may have a bulk or untapped density that is less, such as between about 0.4 and 0.6 g/cc. Stated differently, the crust portion 172 may have a density that is at least 1.5, 2, or even 3 times the bulk/untapped density of the powder portion 174.

There are also various ways to characterize the extent of the crust portion 172. For example, the bonding agent 120 has an axial length $l_0$ measured along the longitudinal axis A1 between the first and second ends 164, 166. The first and second ends 164, 166 may be part of respective first and second regions of the bonding agent 120 that each represent between about 1% and about 33% of the overall axial length $l_0$ of the bonding agent 120. Stated differently, and as shown in FIG. 11, the first and second regions may have respective axial lengths $l_1$ and $l_2$ that are between about 1% and about 33% of the overall axial length $l_0$. The first and second regions may alternatively be characterized with reference to the diameter D1 (FIG. 4) of the first section 104 of the ferrule bore 102. For example, the first and second regions have respective axial lengths $l_1$ and $l_2$ that are each between about 1% and about 50% of the outer diameter D1. In some embodiments (including any of those mentioned above), at least 90% of the bonding agent 120 in the first region has been melted and solidified (i.e., is in the form of crust portion 172). In these or other embodiments, at least 90% of the bonding agent 120 in the second region has been melted and solidified (i.e., is in the form of crust portion 172).

As shown in FIG. 11, the crust portion 172 may even be formed in a peripheral region of the bonding agent 120 that is between the first and second ends 164, 166 and in contact with the surface of the ferrule bore 102. The powder portion 174 then comprises a central region of the bonding agent 120 surrounded by the peripheral region. In some embodiments, the crust portion 172 may have a thickness T between about 1% and about 30% of the outer diameter D1 (FIG. 4; the thickness T is measured from where the bonding agent 120 contacts the surface of the ferrule bore 102 to the nearest location of the crust portion 172). Although FIG. 11 illustrates the crust portion 172 being formed around an entire periphery of the bonding agent 120, in some embodiments only the first and second ends 164, 166 of the bonding agent 120 may form a crust portion.

As can be appreciated, by forming the crust portion 172 in at least the first and second ends 164, 166 of the bonding agent 120, the bonding agent 120 is more securely coupled to the ferrule bore 102 compared to the situation where no amount of the bonding agent 120 has been melted and solidified. This helps preserve the predetermined amount of the bonding agent 120 in the ferrule bore 102 between the time of forming the fiber optic connector sub-assembly 130 and the time when the fiber optic connector sub-assembly 130 is used during a cable assembly/termination process. The period between times may be significant, such at least a day, a week, a month, or even a year. And during this period, the fiber optic connector sub-assembly 130 may be transported and otherwise handled in various manners. The likelihood of the bonding agent 120 migrating out of the ferrule 12 during this period may be reduced or eliminated by forming the fiber optic connector sub-assembly 130 in the manner described above.

In addition to helping preserve the predetermined amount of the bonding agent 120 in the ferrule bore 102, forming the crust portion 172 also helps preserve the bonding agent 120 in the location where the bonding agent 120 is initially disposed in the ferrule bore 102. The improvement in consistency simplifies or otherwise facilitates termination processes involving the fiber optic connector sub-assembly 130.

Furthermore, when the bonding agent 120 comprises a partially cross-linkable polymer resin, the heating of the bonding agent 120 may be carefully controlled so that the crust portion 172 melts and solidifies without irreversible chemical bonding between adjacent polymer chains of the polymer resin. This may be achieved by heating the ferrule 12 (and, ultimately, portions of the bonding agent 120) above the melting temperature of the bonding agent, but below the cross-linking temperature of the bonding agent. One of the advantages of such a process is that the resulting fiber optic connector sub-assembly 130 not only has the bonding agent 120 more securely coupled to the ferrule bore 102, but also preserves the ability of the bonding agent 120 to form even greater adhesion properties at a later point in time. In particular, the irreversible cross-linking and greatest adhesion properties of the bonding agent 120 can be reserved for the cable assembly/termination process in which the fiber optic connector sub-assembly 130 is eventually used.

Now that methods of forming the fiber optic connector sub-assembly 130 have been introduced, some more specific examples relating to the heating process will be described. The first and second heating sources 160, 162 in FIG. 10 are shown in a generic manner because any suitable heating source may be used to heat the ferrule 12. For example, the heating source(s) associated with the heating process may comprise one or more laser(s), oven(s), resistive wire(s) wrapped around the ferrule, or the like.

Figure 12:
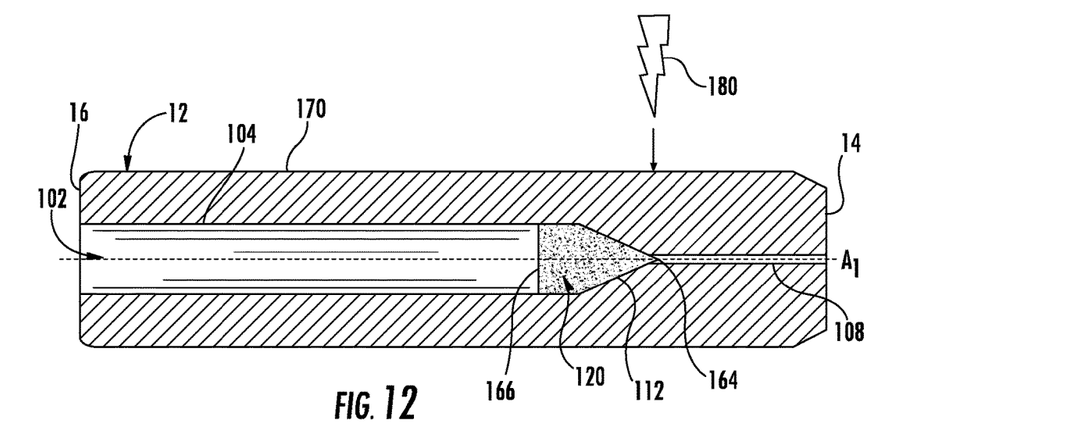
FIGS. 12-14 are schematic views illustrating an example of a heating process for a method of forming a fiber optic connector sub-assembly according to another embodiment of this disclosure.
Figure 13:
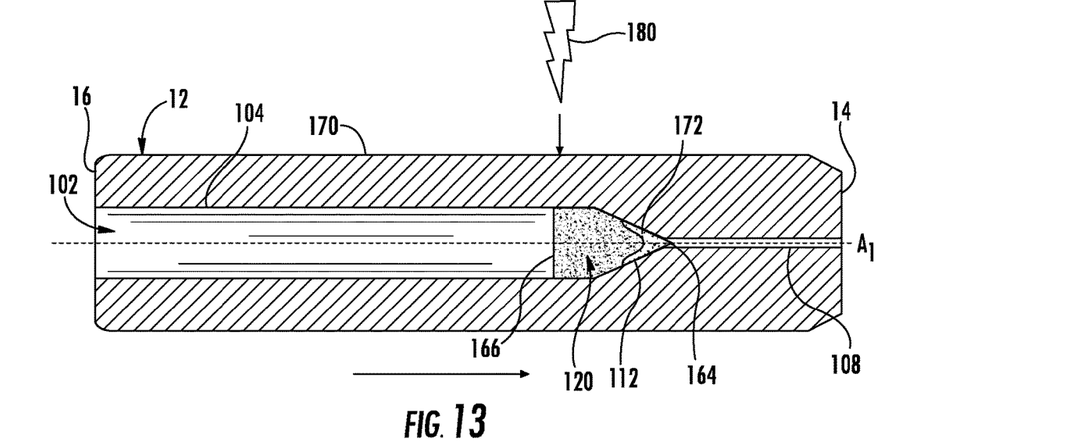
Figure 14:
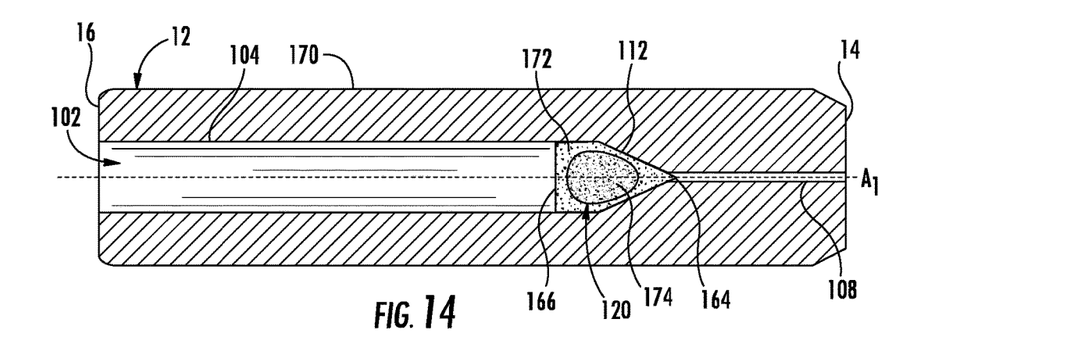

In the embodiment shown in FIGS. 12-14, a single heating source represents a laser 180 that is first used to irradiate the ferrule 12 at the first location. If desired, the ferrule 12 may be rotated relative to the laser 180, or vice-versa, to irradiate all or portions of the circumference of the ferrule 12 at the first location. Relative axial movement may then be initiated between the ferrule 12 and laser 180 (i.e., the ferrule 12 may be moved relative to the laser 180, or vice-versa, in a direction along or parallel to the longitudinal axis A1) to bring a beam of the laser 180 into alignment with the second location. At this point, and as schematically shown in FIG. 13, the laser 180 may then be operated to irradiate the ferrule 12 at the second location. Again, if desired, the ferrule 12 may be rotated relative to the laser 180, or vice-versa, to irradiate all or portions of the circumference of the ferrule 12.

One of the advantages of irradiating the ferrule 12 at two or more axial locations is that the bonding agent 120 can be more strategically melted. For example, attempting form a laser beam that spans a length between the two locations may not lead to uniform (or at least as uniform) melting of the bonding agent 120 where the melting is needed most—namely, the first and second ends 164, 166 of the bonding agent—to provide the above-mentioned benefits. This, in turn, may result in air voids or other undesirable attributes in the crust portion 172. Nevertheless, the present disclosure does not exclude forming a laser beam that spans a length of the ferrule 12 corresponding to a greater portion or all of the axial length $l_0$ (FIG. 11) of the bonding agent 120.

Figure 15:
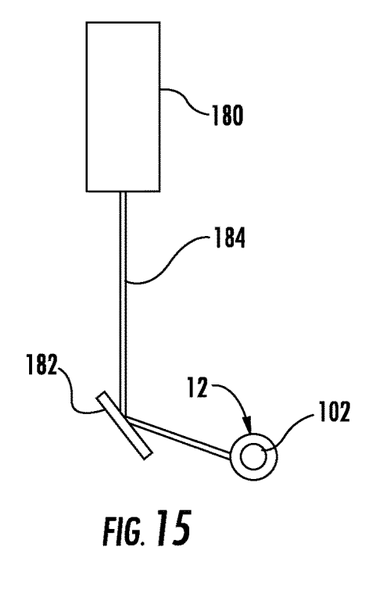
FIG. 15 is a schematic view of one example of an arrangement for carrying out methods according to some embodiments of this disclosure.
Figure 16:
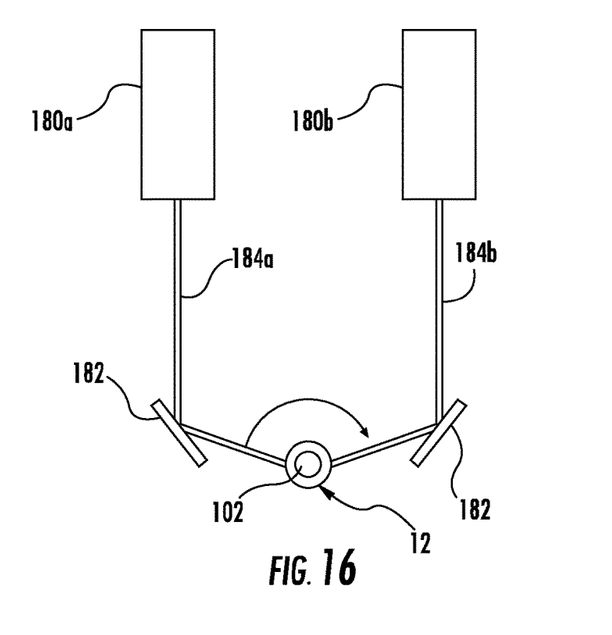
FIG. 16 is a schematic view of another example of an arrangement for carrying out methods according to some embodiments of this disclosure.
Figure 17:
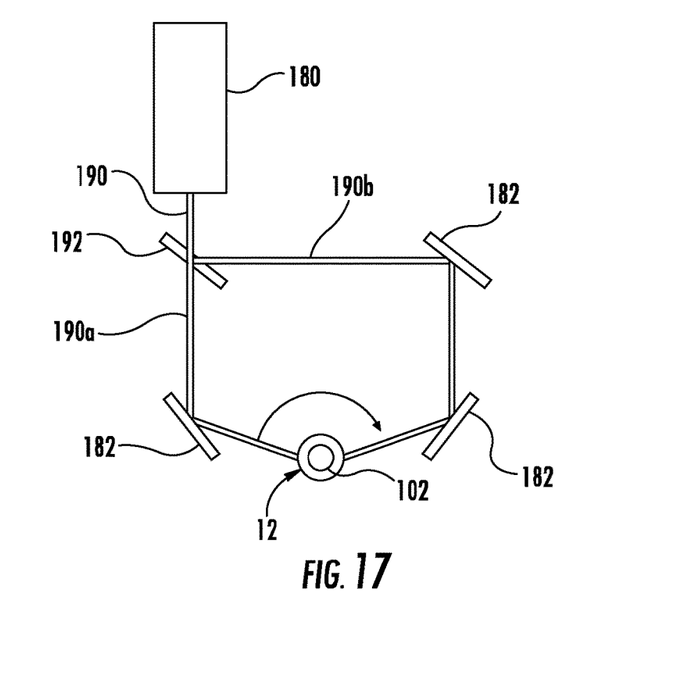
FIG. 17 is a schematic view of yet another example of an arrangement for carrying out methods according to some embodiments of this disclosure.

FIGS. 15-17 schematically illustrate various ways one or more lasers 180 may be arranged relative to the ferrule 12. In FIG. 15, a reflector 182 is used to direct a laser beam 184 at the ferrule 12, which may allow the laser 180 to be positioned in an optimized manner. In FIG. 16, first and second lasers 180a, 180b are used to emit respective first and second beams 184a, 184b that impinge opposite sides of the ferrule 12. Such an arrangement may be an effective way to heat the ferrule 12 and melt some of the bonding agent 120 without relative rotation between the ferrule 12 and one or more lasers, although such relative rotation may still be initiated if desired. FIG. 17 illustrates an arrangement similar to FIG. 16, except that only a single laser 180 is used to irradiate opposite sides of the ferrule 12. The laser 180 emits a laser beam 190 that is split into two beam portions 190a, 190b (or "legs") by a beam splitter 192, with each beam portion 190a, 190b being directed by one or more reflectors 182 to impinge opposite sides of the ferrule 12. Optical elements, such as lenses, may be positioned anywhere in the path of the beam portions 190a, 190b to shape or otherwise focus the beam portions 190a, 190b in a particular way, if desired.

Each of the arrangements in FIGS. 15-17, or variants thereof, may be used to heat the ferrule 12 at both the first and second locations, analogous to the single laser 180 in the embodiment discussed with reference to FIGS. 12-14. Alternatively, there may be a separate and distinct setup or arrangement of one or more lasers for heating the ferrule 12 at the first and second locations. For example, the ferrule 12 may be positioned relative to a first arrangement of one or more lasers, heated at a first location, moved and positioned relative to a second arrangement of one or more lasers, and then heated at a second location. The first and second arrangements may be the same or different arrangements.

Filling the Micro-Hole of the Ferrule Bore

In some instances, it may be desirable to fill the second section 108 of the ferrule bore 102 with the bonding agent 120 when forming the fiber optic connector sub-assembly 130. For example, in some embodiments the front end 14 of the ferrule 12 may be grinded or otherwise re-shaped prior to being installed on an optical fiber to form an end face with a specific geometry (e.g., an angled physical contact (APC) end face). Such additional processing has the potential to deposit debris in the second section 108, which can make inserting an optical fiber during a later termination process challenging (and even impossible in some instances). Even if there is no additional processing, the ferrule 12 may be exposed during normal handling and transport to debris that also has the potential to migrate into and block the second section 108. Filling the second section 108 of the ferrule bore 102 may also help ensure that an optical fiber terminated with the ferrule 12 is surrounded by the bonding agent 120 within the second section 108 after the termination process. This, in turn, can improve adhesion strength and reliability.

One of the challenges in filling the second section 108 of the ferrule bore 102 with the bonding agent 120 relates to the relatively small size of the ferrule bore 120. Simply loading the bonding agent 120 into the ferrule bore 102 in the manner described above may not result in a sufficient amount of the bonding agent 120 occupying the second section 108. This may especially be the case when the bonding agent 120 is initially disposed in the ferrule bore 102 in a powder form, as the solid nature and size of particles in such a material may make it difficult to locate the bonding agent 120 in the second section 108 of the ferrule bore 102. Moreover, even if there can be a substantial amount of the bonding agent 120 initially disposed in the second section 108 in alternative embodiments, it is still desirable to melt and solidify at least some of the bonding agent 120 for the reasons mentioned above.

Figure 18:
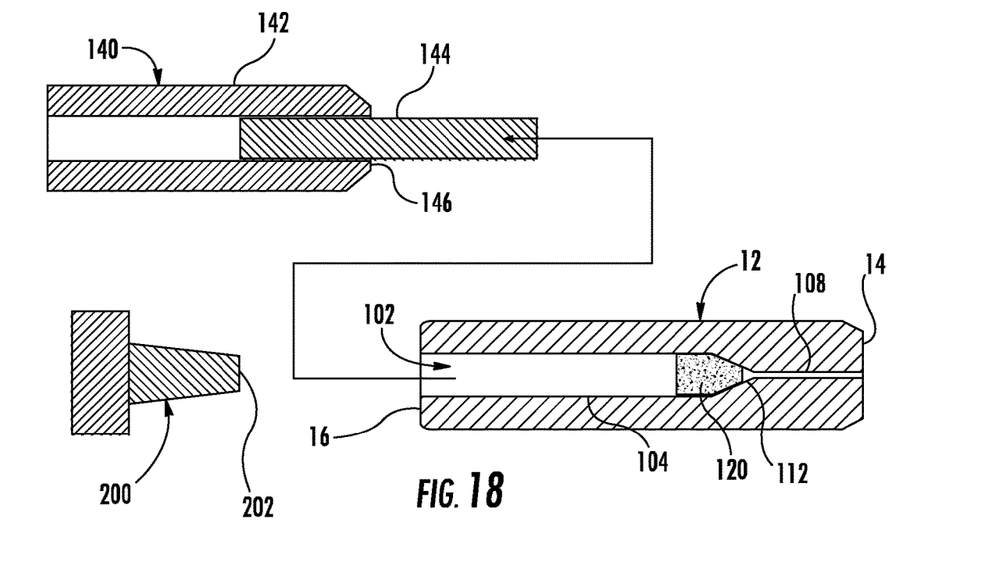
FIGS. 18-23 are schematic views that sequentially illustrate a further example of a method of forming a fiber optic connector sub-assembly.

One example of a method for making the fiber optic connector sub-assembly 130 with more bonding agent disposed in the second section 108 of the ferrule bore 102 is shown in FIGS. 18-23. The bonding agent 120 may be initially disposed in the ferrule bore 102 in the manner described above with reference to FIGS. 5-9 (e.g., using the loading device 140) or in any other manner. The bonding agent 120 is initially disposed in the transition section 112 of the ferrule bore 102, although there may be some amounts also disposed in the first and second sections 104, 108 in some embodiments, as shown in FIG. 18. The amount of the bonding agent 120 initially disposed in the second section 108 in such embodiments may be relatively small. For example, the bonding agent 120 initially disposed in the ferrule bore 102 may occupy less than 50%, less than 25%, or even less than 10% of the volume of the second section 108 in some embodiments.

Figure 19:
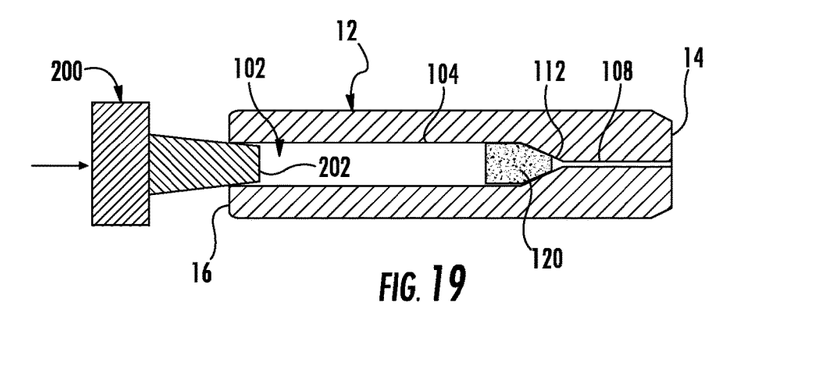

To assist moving more of the bonding agent 120 into the second section 108 of the ferrule bore 102 before or during a heating of the ferrule 12, a nozzle 200 may be coupled to the rear end 16 of the ferrule 12. FIG. 19 schematically illustrates the nozzle 200 including an outlet 202 communicating with the ferrule bore 102 at this point. Pressurized air or other gas may be supplied through the nozzle 200 and into the ferrule bore 102 to apply pressure to the bonding agent 120. The pressure can help force at least some of the bonding agent 120 from the transition section 112 into the second section 108, especially after heating and melting at least some of the bonding agent 120.

Figure 20:
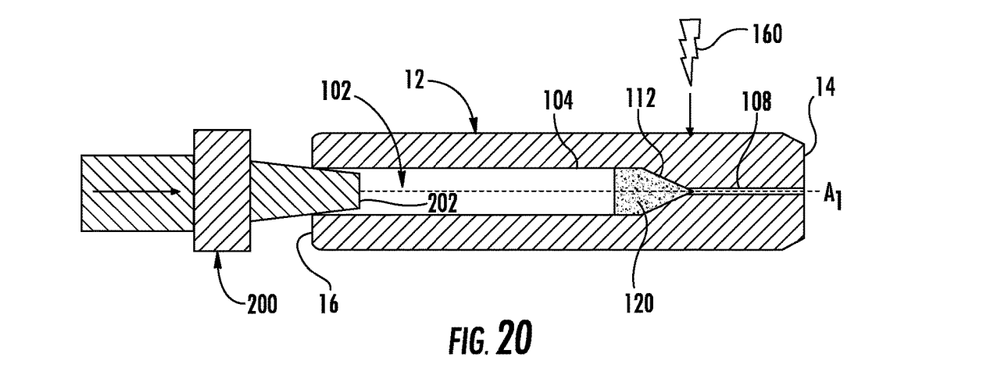
Figure 21:
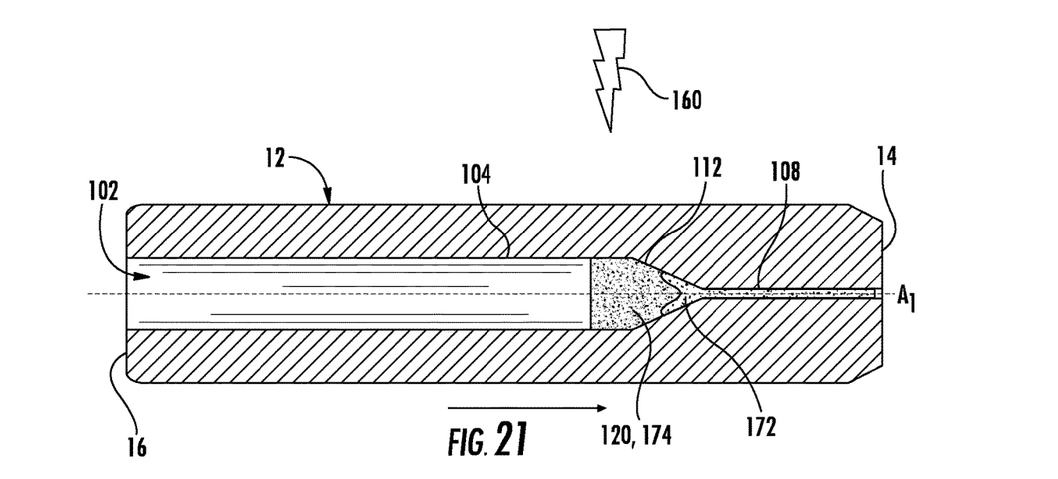
Figure 22:
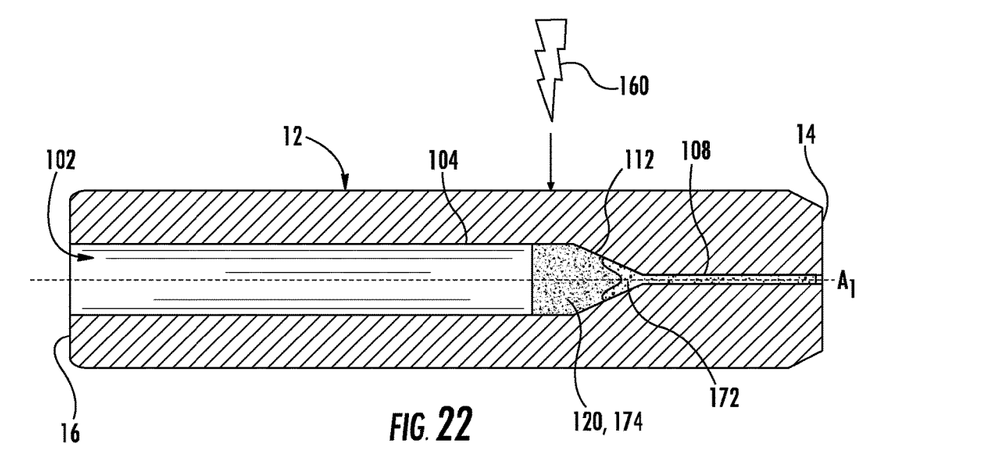

To this end, FIGS. 20-22 schematically illustrate the ferrule 12 being heated at first and second locations by a heating source 160. The heating may be achieved using any of the principles discussed above. For example, there may alternatively be first and second heating sources like the embodiment in FIG. 10. The various methods of heating, including the different types, arrangements, and operation of heating sources discussed with reference to FIGS. 10 and 12-17, remain possibilities. The heating source 160 may represent one or more lasers, for example. In such embodiments, the laser beam(s) may even be focused using lenses or other optical elements to impinge over a longer length of the ferrule 12. This may be particularly advantageous for the heating source 160, as heating both a portion of the transition section 112 and a portion of the second section 108 when heating the ferrule 12 at the first location may help promote flow of the bonding agent 120 that has melted into the second section 108.

As can be seen in FIGS. 20 and 21, at least some of the bonding agent 120 melts after heating the ferrule at a first location with the heat source 160, and the melted bonding agent 120 eventually solidifies (e.g., through passive or active cooling) in the second section 108 of the ferrule bore 102. In the embodiment shown, at least some of the bonding agent 120 initially disposed in the transition section 112 has melted and flowed into the second section 108. As a result, there is an increased amount of the bonding agent 120 in the second section 108. Indeed, in some embodiments, the bonding agent 120 may occupy at least 90% of the volume of the second section 108 following the heating and solidification.

The flow of the bonding agent 120 may be assisted by the pressurize air supplied by the nozzle 200, as noted above. The nozzle 200 acts as an air coupling, forming a seal with the ferrule bore 102. The supply (not shown) of air or other gas to the nozzle 200 may be turned on before the heating source 160 to apply pressure before heating, and turned off shortly prior to or when the heating source 160 is activated. Alternatively, the supply may be kept on for a period of time while the heating source 160 is in operation. Other methods of applying pressure to the bonding agent 120 before or during the heating step will be appreciated. Additionally, rather than supplying pressurized air with a nozzle, in some embodiments a vacuum (not shown) may be coupled to the front end 14 of the ferrule 12 over the opening of the ferrule bore 102. The vacuum may be operated to assist at least some of the bonding agent 120 that has melted in the transition section 112 to flow into the second section 108 of the ferrule bore 102.

In some embodiments, the heating source 160 may be controlled based on the flow of the bonding agent 120 into the second section 108 of the ferrule bore 102. For example, equipment may be used to monitor when some of the bonding agent 102 reaches or exits the end of the ferrule bore 102. The heating source 160 may then be deactivated in response to the detection of the bonding agent 120. This may help ensure that the heating process has been carried out long enough for the bonding agent 120 to substantially or completely occupy the second section 108 of the ferrule bore 102.

As can be appreciated from FIGS. 21 and 22, eventually the ferrule 12 is heated at the second location, similar to the embodiment discussed above with respect FIG. 10, to melt an additional amount of the bonding agent 120. Like the embodiment in FIG. 10, the additional amount of the bonding agent 120 heated at this stage was initially disposed in the ferrule bore 102. In alternative embodiments not shown, there may only be a small amount of the bonding agent 120 initially disposed in the ferrule bore 102. After heating the first location of the ferrule 12 to melt some or all of this small amount, and after allowing the melted bonding agent 120 to solidify in the second section 108 of the ferrule bore 102 (similar to FIGS. 20 and 21), an additional amount of the bonding agent 120 may be loaded into either or both the first section 104 and the transition section 112 of the ferrule bore 108. The ferrule 12 may then be heated at the second location to melt at least some of this additional amount. Either way, the additional amount of the bonding agent 120 that melts when heating the ferrule 12 at the second location is eventually cooled and solidified in either or both the first section 104 and the transition section 112 of the ferrule bore 102.

Figure 23:
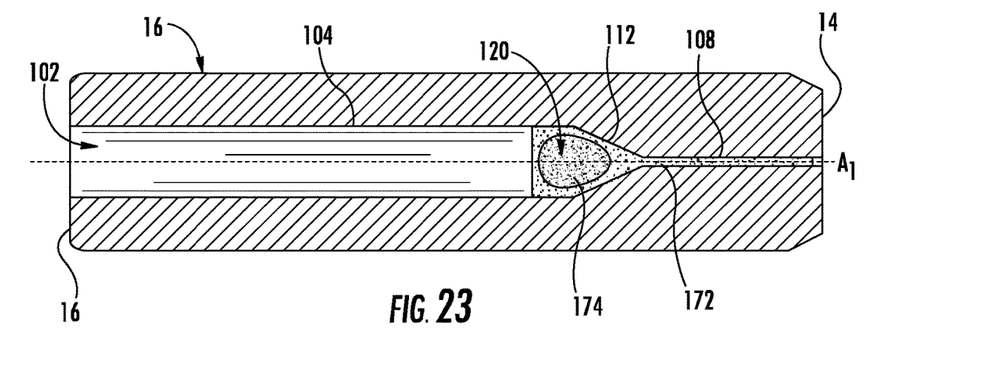

FIG. 23 illustrates the fiber optic connector sub-assembly 130 resulting from the process shown in and described with reference to FIGS. 18-22. As can be appreciated, the bonding agent that has been melted and solidified can still form a crust portion 174 around a portion 174 of the bonding agent that has not been melted and solidified. In this regard, the fiber optic connector sub-assembly remains similar to the one discussed above with reference to FIG. 11, except that an increased amount of the bonding agent 120 occupies the second section 108 of the ferrule bore 102. Again, the bonding agent 120 may substantially or entirely occupy the second section 108 as a result of the process shown in and described with reference to FIGS. 18-22. Most or all of the bonding agent 120 in the second section 108 may be part of the crust portion 172. For example, at least 90% of the bonding agent 120 disposed within the second section 108 of the ferrule bore 102 may have been melted and solidified.

The portion 174 that has not been melted and solidified may be a powder portion 174, as mentioned above, when the bonding agent 120 is initially disposed in the ferrule bore 102 in a powder form. Therefore, the various ways of characterizing the difference between the crust portion 172 and powder portion 174 mentioned above (e.g., differences in crystallinity and/or density) remain applicable.

Persons skilled in optical connectivity will appreciate additional variations and modifications of the elements disclosed herein. Such persons will also appreciate variations and modifications of the methods involving the elements disclosed herein. For example, although embodiments are described above where less than all of the bonding agent is heated and solidified when forming a fiber optic connector sub-assembly, in alternative embodiments all or substantially all of the bonding agent may be heated and solidified. In such embodiments, the heating may still be controlled so that the bonding agent does not irreversibly cross-link and/or end up with a high degree of crystallinity (e.g., a spherulipic crystallinity above 60%). For example, when the bonding agent comprises a partially cross-linkable polymer resin like the ones disclosed here, the bonding agent may be heated to above 250° C. but kept below 350° C., or even 300° C.

In addition to appreciating these and other variations, skilled persons will appreciate alternatives where some of the steps described above are performed in different orders. To this end, where a method claim below does not actually recite an order to be followed by its steps or it is not otherwise specifically stated in the claims below or description above that the steps are to be limited to a specific order, it is no way intended that any particular order be inferred.

What is claimed is:

1. A method of making a fiber optic connector sub-assembly that includes a ferrule having a front end, a rear end, a ferrule bore extending between the front and rear ends along a longitudinal axis, the method comprising:
   (a) initially disposing a bonding agent in the ferrule bore of the ferrule;
   (b) heating at least a portion of the ferrule above a melting temperature of the bonding agent initially disposed in the ferrule bore so that some of the bonding agent melts; and
   (c) solidifying the bonding agent that has melted in step (b) to form the fiber optic connector sub-assembly;
   wherein:
      the bonding agent has first and second ends along the longitudinal axis that have been melted and solidified following steps (b) and (c); and
      a portion of the bonding agent initially disposed in the ferrule bore in step (a) remains below the melting temperature of the bonding agent during steps (b) and (c) so as to not melt and solidify during steps (b) and (c).

2. The method of claim 1, wherein the bonding agent initially disposed in the ferrule bore comprises a powdered material.

3. The method of claim 2, wherein the powdered material comprises particles of the bonding agent, the particles having an average size between about 5% and about 10% of a minimum diameter of the ferrule bore.

4. The method of claim 2, wherein the bonding agent that has been melted and solidified has a density between about 1.0 g/cc and about 1.5 g/cc, and further wherein the portion of the bonding agent between the first and second ends that has not been melted and solidified during steps (b) and (c) has a bulk density that is less than 1.0 g/cc.

5. The method of claim 2, wherein the bonding agent that has been melted and solidified has a density between about 1.3 g/cc and about 1.4 g/cc, and further wherein the portion of the bonding agent between the first and second ends that has not been melted and solidified during steps (b) and (c) has a bulk density that between about 0.4 g/cc and about 0.6 g/cc.

6. The method of claim 2, wherein the bonding agent that has been melted and solidified has a density that is at least 1.5 times the bulk density of the bonding agent between the first and second ends that has not been melted and solidified during steps (b) and (c).

7. The method of claim 2, wherein initially disposing the bonding agent in the ferrule bore in step (a) comprises packing the bonding agent into the ferrule bore via compression.

8. The method of claim 7, wherein the bonding agent is packed into the ferrule bore by:
   loading a tube with the bonding agent, wherein the tube is hollow and an inner rod is slidably received in the tube, the inner rod being in a retracted position where a front end of the inner rod is recessed within the tube when loading the tube with the bonding agent;
   contacting the rear end of the ferrule with a front end of the tube when the tube has the bonding agent loaded therein; and
   sliding the inner rod relative to the tube and into the ferrule bore to move the bonding agent out of the tube and into the ferrule bore.

9. The method of claim 1, wherein heating at least a portion of the ferrule in step (b) comprises irradiating at least a portion of the ferrule with at least one laser.

10. The method of claim 9, wherein the ferrule is irradiated at two or more locations spaced apart between the front and rear ends of the ferrule.

11. The method of claim 1, wherein:
   the bonding agent comprises a partially cross-linkable polymer resin;
   the partially cross-linkable polymer resin has a melting point between about 250° C. and about 350° C.; and
   the bonding agent that is melted in step (b) is kept below 350° C.

12. The method of claim 1, wherein step (c) is performed without any optical fiber being located in the ferrule bore.

13. A method of making a fiber optic connector sub-assembly that includes a ferrule having a front end, a rear end, and a ferrule bore extending between the front and rear ends along a longitudinal axis, wherein the ferrule bore includes a first section extending inwardly from the rear end of the ferrule and having a first width, a second section extending inwardly from the front end of the ferrule and having a second width that is less than the first width, and a transition section located between the first section and the second section, the method comprising:
   (a) initially disposing a bonding agent in at least the transition section of the ferrule bore without there being any optical fiber present in the ferrule bore;
   (b) heating at least a portion of the ferrule above a melting temperature of the bonding agent initially disposed in the ferrule bore so that some of the bonding agent melts; and
   (c) solidifying the bonding agent that has melted in step (b) to form the fiber optic connector sub-assembly without there being any optical fiber present in the ferrule bore;
   wherein:
      the bonding agent has first and second ends along the longitudinal axis that have been melted and solidified following steps (b) and (c); and
      a portion of the bonding agent initially disposed in the ferrule bore in step (a) remains below the melting temperature of the bonding agent during steps (b) and (c) so as to not melt and solidify during steps (b) and (c).

14. The method of claim 13, wherein the bonding agent initially disposed in the ferrule bore comprises a powdered material.

15. The method of claim 14, wherein the bonding agent that has been melted and solidified has a density between about 1.0 g/cc and about 1.5 g/cc, and further wherein the portion of the bonding agent between the first and second ends that has not been melted and solidified during steps (b) and (c) has a bulk density that is less than 1.0 g/cc.

16. The method of claim 14, wherein the bonding agent that has been melted and solidified has a density that is at least 1.5 times the bulk density of the bonding agent between the first and second ends that has not been melted and solidified during steps (b) and (c).

17. The method of claim 14, wherein initially disposing the bonding agent in the ferrule bore in step (a) comprises packing the bonding agent into the ferrule bore via compression.

18. A method of making a fiber optic connector sub-assembly that includes a ferrule having a front end, a rear end, a ferrule bore extending between the front and rear ends along a longitudinal axis, the method comprising:

(a) initially disposing a bonding agent in the ferrule bore of the ferrule, wherein the bonding agent comprises a powdered material;
(b) heating at least a portion of the ferrule above a melting temperature of the bonding agent initially disposed in the ferrule bore so that some of the bonding agent melts; and
(c) solidifying the bonding agent that has melted in step (b) to form the fiber optic connector sub-assembly;

wherein:
the bonding agent has first and second ends along the longitudinal axis that have been melted and solidified following steps (b) and (c); and
a portion of the bonding agent initially disposed in the ferrule bore in step (a) remains below the melting temperature of the bonding agent during steps (b) and (c) so as to not melt and solidify during steps (b) and (c);

and further wherein:
the bonding agent comprises a partially cross-linkable polymer resin;
the partially cross-linkable polymer resin has a melting point between about 250° C. and about 350° C.; and
the bonding agent that is melted in step (b) is kept below 350° C.

19. The method of claim 18, wherein step (c) is performed without any optical fiber being located in the ferrule bore.

20. The method of claim 19, wherein initially disposing the bonding agent in the ferrule bore in step (a) comprises packing the bonding agent into the ferrule bore via compression.

* * * * *